United States Patent [19]
Gindler

[11] 3,754,864
[45] Aug. 28, 1973

[54] MICELLE-FORMING PROTECTIVE COLLOID IN COLORIMETRIC ANALYSIS

[75] Inventor: E. Melvin Gindler, Rockford, Ill.

[73] Assignee: Pierce Chemical Company, Rockford, Ill.

[22] Filed: Jan. 31, 1972

[21] Appl. No.: 222,375

Related U.S. Application Data

[63] Continuation-in-part of Ser. No. 215,638, Jan. 5, 1972.

[52] U.S. Cl. .............................................. 23/230 B
[51] Int. Cl. .......................................... G01n 33/16
[58] Field of Search .................... 23/230 B, 253 TP; 252/408

[56] References Cited
UNITED STATES PATENTS

| | | | |
|---|---|---|---|
| 2,955,011 | 10/1960 | Riegel ...................................... 8/85 |
| 3,533,749 | 10/1970 | Kleinman .......................... 23/230 B |
| 3,547,586 | 12/1970 | Denney et al. ..................... 23/230 R |

OTHER PUBLICATIONS

Molyneux, P., Chem. Abstr. 67, 22268d (1967)

Primary Examiner—Morris O. Wolk
Assistant Examiner—R. M. Reese
Attorney—C. Frederick Leydig, Thomas E. Currier et al.

[57] ABSTRACT

A colorimetric process for accurately determining the concentration of a metal in a protein containing biologic fluid wherein protein is not present in the standard solution used for calibration. The method is applicable with respect to the use of metal binding reagent dyes having metallized and/or free dye spectra influenced by the presence of protein and permits the spectrum obtained from the protein containing fluid sample to be accurately correlated with the spectrum obtained from the non-protein containing standard solution. The method can be accomplished by adding a particularly selected micelle-forming protective colloid to the standard solution and, preferably, also to the biologic fluid sample being analyzed.

10 Claims, No Drawings

MICELLE-FORMING PROTECTIVE COLLOID IN COLORIMETRIC ANALYSIS

RELATED APPLICATIONS

This application is a Continuation-In-Part of Ser. No. 215,638 filed on Jan. 5, 1972 entitled Colorimetric Determination of Calcium in Biologic Fluids.

DESCRIPTION OF THE INVENTION

The present invention relates to the analysis of biologic fluids and, more particularly, to a procedure for colorimetrically analyzing biologic fluids containing substantial quantities of proteins.

Colorimetric methods are widely used for determining the concentration of various elements such as calcium and magnesium in biologic fluids such as blood. The methods usually involve adding a reagent generally in an aqueous solution to the fluid which forms a colored complex having a characteristic wavelength of maximum light absorption with the element to be detected. By exposing a sample of the fluid containing the complexed reagent to a light source of the characteristic wavelength of maximum absorption, or maximum difference of absorption with reagent in the blank, and thereafter measuring the degree of light absorption, the content of the element in the biologic fluid can be simply determined from a calibration graph constructed from absorbance measurements made on standard reagent solutions containing known concentrations of the element. The absorbance of both the sample and the standard are generally read against a blank containing the reagent solution. Reagents useful in such colorimetric techniques can be metal binding dyes such as, for example, methylthymol blue for calcium detection and calmagite for magnesium detection.

A problem is encountered in colorimetrically determining metal concentrations when (a) the biologic fluid being analyzed contains protein, (b) the reagent dye in either free or metallized form or both, has the tendency to bind protein, and (c) the absorbance spectrum of the protein bound, metallized and/or free dye differs from the spectrum of the unbound complex. Under these conditions, the absorbance spectrum of the sample being analyzed will not be directly correlatable with the spectrum obtained from the completely inorganic standard. And, as a result, the accuracy of the measured metal concentration is diminished.

One solution to the above-discussed problem is to add protein to the standard in order to create a similar spectral influence on the metallized dye complex and free dye in the standard as is present in the sample being analyzed. The difficulty in obtaining pure protein free of metal impurities detracts from the desirability of this approach. A further solution resides in removing protein, by dialysis, ashing, precipitation, or the like, from the biologic fluid sample prior to analysis. However, removal of protein is time consuming and can lead to added expense as well as introduce potential errors in the colorimetric measurement.

Accordingly, it is a principal object of the present invention to provide a means for diminishing potential errors arising from the presence of proteins in the colorimetric determination of metal concentrations without the necessity for either removing proteins from the fluid before analysis or adding protein to the standard employed.

An additional object resides in providing a method for colorimetrically determining metal concentration in a biologic fluid wherein the attributes recited in the principal object are fully realized and in which the removal of metals from the fluid other than the one to be detected is not necessary prior to analysis. Closely related to this object, is the further object of providing a method having the advantages recited in the foregoing objects wherein, during colorimetric analysis, other ingredients conventionally used in colorimetry such as metal masking reagents, buffers, stability aids and the like can also be present.

In combination with the previously recited objects, a still further object of the present invention is to provide a colorimetric method for the analysis of biologic fluids wherein the turbidity of the fluid during analysis is reduced.

Other objects and advantages of the present invention will become apparent upon reading the following detailed description.

While the invention is susceptible of various modifications and alternative constructions, there will herein be described in detail the preferred embodiments. It is to be understood, however, that it is not intended to limit the invention to the specific forms disclosed. On the contrary, it is intended to cover all modifications and alternative constructions falling within the spirit and scope of the invention as expressed in the appended claims.

Briefly stated, in its broadest aspect the present invention is accomplished by including a micelle-forming protective colloid in the standard reagent dye solution from which the calibration graph is constructed. It has been discovered that by carefully selecting the colloid used with respect to the reagent dye employed, the colorimetric spectrum of the standard can be made to closely mimic the spectrum of the biologic fluid sample containing protein, free reagent dye and the metallized dye complex. As a result of the presence of the colloid and the resulting spectral mimicry, the calibration graph will reflect the spectral influence due to the presence of protein in the biologic fluid being analyzed and, accordingly, accurate determination of metal concentrations can be obtained. The advantages of this technique principally reside in the fact that useful protective colloids can be readily obtained completely free from metals and are inexpensive compared with protein containing no metal impurities. As hereinafter discussed, a protective colloid is also preferably added to the biologic fluid sample being analyzed in order to minimize turbidity due to the presence of lipids. Under these circumstances, it has similarly been found that by appropriately selecting the colloid used, spectra duplication between the fluid being analyzed and the standard solution used for calibration can also be achieved with the accompanying advantage heretofore mentioned.

The present invention is applicable with respect to many protein containing fluids examples of which include blood serum, urine, and the like. It is thought that it is mainly the albumin constituent of protein which interacts with the metallized dye complex to influence spectra.

Regarding the reagent dyes for which the present invention is applicable, it has been previously indicated that these dyes are those which, in either free and/or metallized form, have an absorption spectrum which differs from the spectrum of the metallized dye complex and free dye in the absence of protein. The difference in spectra can be in either the degree of absorbance at a given metal concentration or in a different wavelength of maximum absorption. As hereinafter described in detail, simple experimentation can be used to determine whether the technique of the present invention is applicable with respect to the use of a given reagent dye.

Of course, in combination with the above-described characteristics useful dyes should have those other basic characteristics enabling their use in colorimetry. Thus, for example, they should form metal complexes which sufficiently absorb light to permit colorimetric analysis as well as exhibiting a characteristic wavelength of maximum absorption within a range suitable for detection using available colorimeters or spectrophotometers. The selection of the particular dye is generally determined by the metal sought to be detected with the dye generally exhibiting a strong tendency to bind the metal in preferance to other metals which may be present in the fluid. For the colorimetric detection of any given metal, many commercially available dyes are known to be useful.

There are several simple procedures which can be used to determine the applicability of the present invention after the metal to be detected and the reagent dye to be used have been selected. One technique is to obtain the spectrum of an aqueous solution containing only the metallized dye complex and free dye and also the spectrum of an aqueous solution containing the same quantity of metallized dye complex and free dye and also very pure protein. The presence of a difference in spectrum between the two solutions establishes the applicability of the present invention with respect to the use of this reagent dye whenever the fluid analyzed contains protein. This particular approach is preferred for establishing the applicability of the present invention for a particular dye since any difference in spectral characteristics must be attributable to the only difference between the two solutions, i.e., the presence or absence of protein. In ascertaining spectral differences by this technique, the spectra for both samples should be obtained against the same blank solution, e.g., water. Alternatively, any difference in spectra between the two samples can be established by running one sample against the other and observing if any degree of absorption difference is recorded by the spectrophotometer.

A second technique for establishing whether the present invention is applicable to a given reagent dye and metallized dye complex is to obtain the metal concentration in a protein containing fluid by a non-colorimetric method wherein the influence of protein on the measurement is not present. Such techniques include atomic absorption, titration, or gravimetric procedures. If the determined metal concentration by one of these technqiues is different from that obtained colorimetrically, it can be assumed that the complexed dye and/or free dye interacts with protein. A still further technique for establishing a protein-metallized dye complex and/or protein-free dye interaction is to remove protein from a fluid sample such as by dialysis or ashing and observe whether the colorimetrically determined absorption spectrum is different from that obtained in the presence of protein.

With respect to protein influence on spectra, it should be understood that the influence of protein on both the spectra of the free dye and the metallized dye must be considered. This is so because, due to the unknown concentration of metal present in the fluid, a quantity of dye substantially in excess of that believed to be necessary to complex with all the metal being detected in the fluid is almost always used. Thus, in the biologic fluid sample being analyzed both free dye and the metallized dye complex are generally present, and the effect of protein on either or both of these can lead to erroneous concentration determination unless the effects are also duplicated in the standard used for calibration.

The accuracy of colorimetric analysis using calmagite to detect magnesium and methylthymol to detect calcium is believed to be improved by the method described herein. The invention is also thought to be applicable with respect to the use of many other metal binding dyes such as arscenazo-I, o-cresolphthalein complexone, methylxylenol blue, sodium alizarinsulfonate, sodium rhodizonate, and the like.

Once it has been established by means of one of the above-described techniques or the like that the spectrum of the metallized dye complex and/or free dye is affected by the presence of protein, the benefits of the present invention can then be realized by adding a micelle-forming protective colloid to the standard when constructing the calibration graph for the particular metallized dye complex employed. In general, useful protective colloids include polyvinylpyrrolidone and non-ionic surfactants such as epoxide polymers and copolymers, e.g., polyethylene and polypropylene oxide; other polyethers; polyamines; other polymeric bases; polymeric acids (such as polymers and copolymers of acrylic and vinylsulfonic acids); long-chain ethers of polyethylene glycol such as the 9-ethyleneoxide adduct of p-nonylphenol,etc.; polyvinyl alcohols; carbohydrate polymers; long-chain betaines; ethylene oxide and propylene oxide copolymers of amines, alcohols, mercaptains, phosphines or glycols; and anionic and cationic surfactants and polymers (including polymerized surfactants) such as sodium dodecyl sulfate and hexadecyl trimethylammonium chloride or bromide, as well as mixtures thereof. The term micelle, as used here, is intended to indicate an aggregation of molecules, generally having long straight or branched chains which are held together by forces other than primary valence forces. It is possible for a single huge molecule to constitute a micelle, in the sense intended here, as when a polyvinylpyrrolidone or other high polymer molecule twines about itself. Although many micelles are spherical, in the micelles mentioned here there is no assumption made with respect to shape. It is also considered possible that the micelle may contain several substances.

As with the selection of dyes to which the present invention is applicable, the selection of the most appropriate protective colloid for use with a given metallized dye complex and free dye can be determined by simple experimentation. For example, a useful procedure involves making up two aqueous solutions containing identical quantities of the metallized dye complex and free dye and adding pure protein to a sample of one of the solutions and different micelle-forming protective colloids to samples of the other solution. Spectra, measured against the same blank, of the protein containing sample and the colloid containing samples are then obtained. The appropriate colloid for use in thereafter accomplishing the present invention in connection with protein containing biologic fluid samples and the metallized dye complex and free dye is the colloid employed in the sample whose spectrum most nearly resembles, with respect to maximum characteristic wavelength and degree of absorbance, that of the protein containing sample.

It should be appreciated that combinations of micelle-forming protective colloids can also be used and, in fact, as hereinafter illustrated, the combination of two protective colloids is desirably used when calmagite reagent dye is used for the detection of magnesium in the presence of protein. On the other hand, with respect to the detection of calcium using methylthymol blue dye, a single colloid such as polyvinylpyrrolidone can be employed.

In accomplishing the above discussed procedures for identifying applicable reagent dyes and protective colloids, the concentration of protein used in the various samples should preferably approximate the concentration normally encountered in biologic fluids. For example, for the preparation of 50 microliter aqueous samples, the addition of about 0.3–0.4 milligrams protein should be made to each of the required samples. Similarly, based on 50 microliters of aqueous sample, metal binding dye quantities of about 0.1–1 micromoles are practical in combination with metal quantities of about 0.02–0.3 micromole. However, in any given sample, the quantity of dye used should exceed that required to complex with all of the metal present. In turn, the amount of protective colloid present should exceed the quantity of dye present, and to this end, based on 50 microliter samples, about 4–80 milligrams of protective colloid is present. However, with respect to observing the existence or absence of spectrum differences between two samples, it is important that the samples compared contain identical amounts of a particular ingredient when the ingredient is present in both samples.

Preferably, in accomplishing colorimetric analysis in accordance with the present invention, the micelle-forming protective colloid is also included in the biologic fluid samples as well as in the standard. Several reasons are present for doing this. First of all, it permits a single reagent dye solution to be used for obtaining both the biologic fluid spectra and the standard spectra. This is desirable since it minimizes the possiblity of error. A further reason for the presence of a colloid in the fluid sample is that it appears to hold lipids in solution and thereby prevent interference in the absorption spectra due to turbidity. When employed for this purpose, the colloid is preferably present in an amount of about 4–80 milligrams per 50 microliters of biologic fluid.

In the event that a protective colloid is to be included in the biologic fluid during colorimetric analysis thereof, it is important that this colloid also be present in preparing all of the samples used in the above-described procedure for establishing the suitability of a given protective colloid with respect to a given metallized dye complex. However, with respect to the procedures discussed above directed to determining whether the spectrum of a particular metallized dye complex and free dye is influenced by the presence of protein, a protective colloid should not be included in any of the samples analyzed.

It appears that, in accomplishing the aims and objectives of the present invention, the colloid can function in either of two ways or a combination thereof. In this respect, it is believed that some colloids strongly and preferentially bind with the metallized dye complex itself and/or free dye thereby preventing protein from binding with the complex and dye. Under these circumstances, the spectrum of a solution containing both the complex, free dye and the colloid would not be influenced by the presence of protein. Accordingly, in establishing whether the spectrum of a solution containing the metallized dye complex and free dye is influenced by the presence of protein and thus the accuracy of concentration measurements therewith capable of being improved by the present invention, no protective colloid should be present. However, in selecting a useful colloid, the colloids tried should be present in the sample containing protein as well as in the non-protein containing sample when the colloid is also going to be present in the biologic fluid during analysis.

A second manner in which the presence of a colloid may function in the present invention is based on the assumption that protein is strongly and preferentially bound to the metallized dye complex and/or the free dye present, and that the spectrum is not altered by the presence of the colloid. However, in the absence of protein, such as in the standard, the colloid binds with the metallized dye complex and/or the free dye to give a spectrum similar to that of the protein bound ingredients in the sample biologic fluid. Were a colloid having this type of behavior present in all samples used in determining the applicability of the present invention to a particular metallized dye complex, a difference in spectra due to protein influence would not be observed and, accordingly, it might be erroneously concluded that the spectrum of the complex is not influenced by the presence of protein. If it were known with certainty that the mechanism described in this paragraph was solely controlling, then the selection of an appropriate colloid for use with a particular reagent dye and metal combination could be determined with or without a colloid being present in the protein-containing sample. However, it is believed that a combination of the above-described mechanisms is probably operative and thus a colloid is preferably included in all samples employed in procedures for selecting an appropriate colloid.

In further keeping with the present invention, ingredients other than the reagent dye and colloid can also be present during colorimetric analysis. Such ingredients are well known in the art and typically include, for example reagents which mask the potentially interferring effects of the presence of metals other than the one sought to be detected (e.g., 8-quinolinol to mask magnesium when detecting calcium and ethylene glycol-2-(2-aminoethylether)-N, N, N', N'- tetraacetic acid, commonly abbreviated as EGTA, to mask calcium when detecting magnesium) and buffers which adjust the pH of the samples being analyzed to a value where absorption response to change in metal concentration is most sensitive. In addition, as disclosed in my above-identified copending application, reducing agents can be desirably included to enhance color stability of certain metallized dye complexes. The stabilizing effect of the reducing agent may be due to its ability to remove radicals involved in the oxidation of the dye by oxygen from the air or in the solution. In accomplishing the above-described procedures to establish the applicability of the present invention to a given metallized dye complex and to select an appropriate micelle-forming protective colloid, any such additional ingredients which will be added to the biologic fluid sample during analysis should also be present in all of the samples used.

In order to illustrate the use of a micelle-forming protective colloid in accordance with the present invention with respect to the detction of magnesium using calmagite reagent dye, spectra were obtained on the various solutions given in Table I. The spectra were obtained with aqueous solutions using a Beckman DB recording spectrophotometer against a blank of pure water. A 5.5 ml. volume of each of the final solutions contained about 1 microgram magnesium, 0.27 milligram reagent dye and the indicated quantities of protein and protective colloids. The protective colloid mixture used consisted essentially of 45.5 mg. of poly-N-vinyl-2-pyrollidone and 4.4 mg. of the 9-ethylene oxide adduct of a p-nonylphenol. Each 5.5 ml. volume of the final solution also contained 0.13 millimole potassium hydroxide, 0.205 milligram EGTA and 0.91 mg. potassium cyanide.

TABLE I

| Example (5.5 ml. final solution) | Characteristic Wavelength of maximum absorption, nm |
|---|---|
| 1. Only metallized dye and free dye | 535 |
| 2. Metallized dye, free dye, and 3.5 milligrams of serum protein | 540 |
| 3. Metallized dye, free dye, and 49.9 milligrams protective colloid mixture | 545 |
| 4. Metallized dye, free dye, 3.5 milligrams of serum protein, and 49.9 milligrams protective colloid mixture. | 545 |

Referring to Table I, the effect of protein in shifting the absorption spectra to a higher maximum characteristic wavelength can be seen by comparing the Examples 1 and 2. Thus, the applicability of the present invention to the magnesium calmagite complex is apparent. Example 3 illustrates the effect of adding the protective colloid to the metallized dye complex of Example 1. The shift in wavelength of maximum absorption to a higher value is similar to that observed with respect to the addition of protein. Referring now to Example 4, the advantages of the present invention become apparent. By comparing Examples 3 and 4 it can be seen that the characteristic wavelength of maximum absorption of a solution containing the protective colloid and protein is about the same as a solution containing only the colloid. Similarly, with respect to absorbance a like shift is also present—the effect of the presence of either protein, the colloid, or both, being to increase the absorbance with the absorbance being substantially the same for Examples 3 and 4. Accordingly, when detecting for magnesium concentration, greater accuracy can be obtained if the protective colloid is used in both the biologic fluid sample being analyzed and in the standard employed for calibration.

While the present method can be accomplished by direct addition of the micelle-forming colloid and other reagents to the fluid sample to be analyzed and the standard, the customary procedure employed by hospitals and the like is to use pre-formulated compositions, generally aqueous solutions, containing the reagent dye and other desired ingredients, e.g., buffers, stability aids, masking ingredients, etc. The pre-formulated compositions are generally referred to as "diagnostic kits" and are sold by a number of chemical supply companies. The principal advantage of "diagnostic kits" is that laboratory workers such as hospital laboratory personnel do not have to be concerned with separately adding the various necessary ingredients in their proper amounts to the samples to be analyzed. The use of "diagnostic kits" speeds the analytical process and reduces the chances of obtaining incorrect results based on, for example, the use of contaminated or improper ingredients.

With respect to the use of calmagite and methylthymol blue reagent dyes it is desirable that the diagnostic kit for each dye contain two separate pre-formulated aqueous compositions referred to as "dye" and "base" solutions. The following compositions (reported as concentrations in one liter of distilled water) illustrate useful dye and base solutions for methylthymol blue and calmagite dyes.

Dye Solution

| Ingredient | Amount In General | Preferred |
|---|---|---|
| Methylthymol blue (sodium salt) | 0.15–0.25 millimole | 0.2 millimole |
| Polyvinylpyrrolidone | 3–9 grams | 6 grams |
| Hydrochloric acid (12 M)[1] | 0.06–0.18 mole | 0.12 mole |
| 8-Quinolinol[2] | 23–75 millimoles | 50 millimoles |
| Calmagite | 0.13–0.20 millimole | 0.167 millimole |
| Polyvinylpyrrolidone | 7–25 grams | 10 grams |
| 9-Ethyleneoxide adduct of p-nonylphenol | 1.5–2.5 grams | 1.8 grams |
| KCl[3] | 0.3–0.45 moles | 0.375 moles |

Base Solution

| Ingredient | Amount In General | Preferred |
|---|---|---|
| For methylthymol blue | | |
| Sodium sulphite[4] | 0.15–0.25 mole | .2 mole |
| Monoethanolamine[5] (Density = 1.022, 20°C.) | 2.8–4.2 moles | 3.7 moles |
| For calmagite | | |
| EGTA[6] | 0.9–1.3 millimole | 1.18 millimole |
| KOH[7] | 0.12–0.16 moles | 0.14 mole |
| KCN[8] | 27–44 millimole | 30.7 millimole |

(1) Used to lower pH and enhance solution stability as described in my above-identified copending application.
(2) Used to mask effect of magnesium.
(3) Used to keep constant ionic strength and thereby insure reproducible relationship between absorption and magnesium ion concentration.
(4) Reducing agent used to enhance color stability and achieve constant ionic strength.
(5) Buffer to achieve pH of about 11.5 in fluid being analyzed.
(6) Used to mask effect of calcium.
(7) Buffer to achieve pH of about 12 in fluid being analyzed.
(8) Used to mask heavy metals such as iron and copper.

In use, the dye and base solutions are mixed together (substantially equal volumes of dye and base for methylthymol blue and a 10:1 ratio of dye to base for calmagite) prior to making the desired calcium or magnesium colorimetric determination. Per 50 microliters of biologic fluid sample, about 3 milliliters of the mixed dye-base solution are conveniently used for calcium determination and about 5 milliliters for magnesium. Absorbance is read at about 612 nm wavelength for calcium and about 532 nm for magnesium using well known colorimetric or spectrophotometric techniques against a blank of each mixed solution. A calibration graph can be used to determine the actual concentration of the metal in the fluid. The graph can be prepared from colorimetric determinations on standard aqueous solutions (50 microliters) containing known metal concentrations (per 100 milliliters of solutions, from 0 to about 25 milligrams of calcium and from about 0 to about 10 milligrams of magnesium) to which 3 or 5 milliliters of the respective dye-base solution have been added with measurements taken against a blank of only the mixed dye-base solution in the indicated volumes and 50 microliters of water. The possibility of erroneous measurements due to the presence of protein in the sample which is not present in the standard is substantially eliminated by the presence of the indicated protective colloids. It has been found that with the present method Beer's law is applicable up to calcium and magnesium concentrations of about 12.5 and 5 milligrams per 100 milliliters of sample, respectively.

I claim:

1. In a colorimetric process for determining the concentration of a metal in a biologic fluid containing protein with the use of a metal binding reagent dye wherein the absorption spectrum of an aqueous solution of protein, the dye, and the metallized dye is different from the spectrum of an otherwise similar solution containing no protein, the improvement wherein the biologic fluid being analyzed and the standard solution used for calibration containing the reagent dye and known concentrations of the metal being detected have added thereto a micelle-forming protective colloid in order to influence the absorption spectra in a manner such that at similar metal and dye concentrations, the absorption spectrum of an aqueous solution of protein, the protective colloid, the dye, and the metallized dye is substantially the same as the absorption spectrum of an aqueous solution of the protective colloid, the dye, and the metallized dye.

2. The process of claim 1 wherein the reagent dye is calmagite.

3. The process of claim 2 wherein the micelle-forming protective colloid is a mixture of polyvinylpyrrolidone and the 9-ethylene oxide adduct of p-nonylphenol.

4. The process of claim 1 wherein the reagent dye is methylthymol blue.

5. The process of claim 4 wherein the micelle-forming protective colloid is polyvinylpyrrolidone.

6. In a colorimetric process for determining the concentration of metal in a biologic fluid containing protein with the use of a metal binding reagent dye wherein the absorption spectrum of an aqueous solution of protein, the dye, and the metallized dye is different from the spectrum of an otherwise similar solution containing no protein, the improvement wherein the standard solution used for calibration which contains the reagent dye and known concentrations of the metal being detected also contains a micelle-forming protective colloid which mimics the presence of protein in the biologic fluid in a manner such that, at similar metal and dye concentrations, the absorption spectrum of an aqueous solution of protein, the dye, and the metallized dye is substantially the same as the absorption spectrum of an aqueous solution of the protective colloid, the dye, and the metallized dye.

7. The process of claim 6 wherein the reagent dye is calmagite.

8. The process of claim 7 wherein the micelle-forming protective colloid is a mixture of polyvinylpyrrolidone and the 9-ethylene oxide adduct of p-nonylphenol.

9. The process of claim 6 wherein the reagent dye is methylthymol blue.

10. The process of claim 9 wherein the micelle-forming protective colloid is polyvinylpyrrolidone.

* * * * *